United States Patent
Wang et al.

(10) Patent No.: US 10,452,612 B2
(45) Date of Patent: Oct. 22, 2019

(54) EFFICIENT DATA CACHING MANAGEMENT IN SCALABLE MULTI-STAGE DATA PROCESSING SYSTEMS

(71) Applicant: Samsung Electronics Co., Ltd., Suwon-si, Gyeonggi-do (KR)

(72) Inventors: Jiayin Wang, Dorchester, MA (US); Zhengyu Yang, Boston, MA (US); Thomas David Evans, San Marcos, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/423,384

(22) Filed: Feb. 2, 2017

(65) Prior Publication Data

US 2018/0067857 A1    Mar. 8, 2018

Related U.S. Application Data

(60) Provisional application No. 62/384,078, filed on Sep. 6, 2016.

(51) Int. Cl.
    *G06F 17/30*    (2006.01)
    *G06F 9/455*    (2018.01)
    (Continued)

(52) U.S. Cl.
    CPC .............. *G06F 16/172* (2019.01); *G06F 3/06* (2013.01); *G06F 9/45558* (2013.01);
    (Continued)

(58) Field of Classification Search
    CPC .............. G06F 12/0811; G06F 2212/62; G06F 12/0868
    See application file for complete search history.

(56) References Cited

U.S. PATENT DOCUMENTS 5,627,990 A    5/1997    Cord et al.
5,768,594 A    6/1998    Blelloch et al.
(Continued)

FOREIGN PATENT DOCUMENTS

CN    103955436    *    7/2014    .......... G06F 12/0811
CN    102467452 B         8/2014
(Continued)

OTHER PUBLICATIONS

Dean, Jeffrey et al., "MapReduce: Simplified Data Processing on Large Clusters", Communications of the ACM, Jan. 2008, vol. 51, No. 1 (pp. 107-113).
(Continued)

*Primary Examiner* — Masud K Khan
(74) *Attorney, Agent, or Firm* — Lewis Roca Rothgerber Christie LLP

(57) ABSTRACT

According to some example embodiments, a method includes: receiving, by a processor, from a data source, a processing profile comprising input data blocks and a plurality of operations for executing using the input data blocks; executing, by the processor, one or more of the operations of the processing profile to generate a new output data after each of the executed one or more operations; storing, by the processor, the new output data from at least one of the one or more operations as intermediate cache data; and transmitting, by the processor, the new output data from a final operation from among the one or more operations to the data source for display thereby.

17 Claims, 7 Drawing Sheets

(51) Int. Cl.
| | | |
|---|---|---|
| *G06F 12/08* | (2016.01) | |
| *G06F 12/123* | (2016.01) | |
| *G06F 12/126* | (2016.01) | |
| *G06F 16/172* | (2019.01) | |
| *G06F 16/188* | (2019.01) | |
| *G06F 12/0862* | (2016.01) | |
| *G06F 12/0808* | (2016.01) | |
| *G06F 12/0842* | (2016.01) | |
| *G06F 12/0811* | (2016.01) | |
| *G06F 3/06* | (2006.01) | |
| *G06F 12/0868* | (2016.01) | |

(52) U.S. Cl.
CPC ...... *G06F 12/0808* (2013.01); *G06F 12/0811* (2013.01); *G06F 12/0842* (2013.01); *G06F 12/0862* (2013.01); *G06F 12/124* (2013.01); *G06F 12/126* (2013.01); *G06F 16/188* (2019.01); *G06F 12/0868* (2013.01); *G06F 2009/4557* (2013.01); *G06F 2009/45579* (2013.01); *G06F 2009/45583* (2013.01); *G06F 2212/1021* (2013.01); *G06F 2212/602* (2013.01); *G06F 2212/6024* (2013.01); *G06F 2212/62* (2013.01)

(56) References Cited

U.S. PATENT DOCUMENTS

| | | |
|---|---|---|
| 6,519,756 B1 | 2/2003 | Kao et al. |
| 6,553,394 B1 | 4/2003 | Perry et al. |
| 6,609,088 B1 | 8/2003 | Wuytack et al. |
| 7,076,640 B2 | 7/2006 | Kadambi |
| 7,194,587 B2 | 3/2007 | McCalpin et al. |
| 8,140,751 B1 | 3/2012 | Wang |
| 8,190,595 B2 | 5/2012 | Bruno et al. |
| 8,417,872 B2 | 4/2013 | Bae et al. |
| 8,463,825 B1 | 6/2013 | Harty et al. |
| 8,495,178 B1 | 7/2013 | Jia et al. |
| 8,874,848 B2 | 10/2014 | Soundararajan et al. |
| 8,918,362 B2 | 12/2014 | Calder et al. |
| 8,924,978 B2 | 12/2014 | Meng et al. |
| 8,953,602 B2 | 2/2015 | Yang et al. |
| 8,959,519 B2 | 2/2015 | Agarwal et al. |
| 8,959,524 B2 | 2/2015 | Hirsch et al. |
| 9,002,939 B2 | 4/2015 | Laden et al. |
| 9,053,167 B1 | 6/2015 | Swift et al. |
| 9,116,913 B2 | 8/2015 | Fukatani et al. |
| 9,182,927 B2 | 11/2015 | Liu et al. |
| 9,189,410 B2 | 11/2015 | Luo et al. |
| 9,201,891 B2 | 12/2015 | Romanski et al. |
| 9,213,721 B1 | 12/2015 | Faibish et al. |
| 9,256,374 B1 | 2/2016 | Aron et al. |
| 9,280,300 B2 | 3/2016 | Liu et al. |
| 9,304,997 B2 | 4/2016 | Beard et al. |
| 9,323,462 B2 | 4/2016 | Olson et al. |
| 9,330,108 B2 | 5/2016 | Jones et al. |
| 9,342,390 B2 | 5/2016 | Chen et al. |
| 9,348,707 B2 | 5/2016 | Kashyap et al. |
| 9,372,630 B2 | 6/2016 | Guo et al. |
| 9,513,814 B1 | 12/2016 | Can et al. |
| 9,817,766 B1 | 11/2017 | Si et al. |
| 10,048,996 B1 | 8/2018 | Bell et al. |
| 2002/0035605 A1 | 3/2002 | McDowell et al. |
| 2003/0109940 A1 | 6/2003 | Guntzer et al. |
| 2004/0193952 A1 | 9/2004 | Narayanan et al. |
| 2005/0010629 A1 | 1/2005 | Hess et al. |
| 2005/0086384 A1 | 4/2005 | Ernst |
| 2006/0026154 A1 | 2/2006 | Altinel et al. |
| 2006/0253674 A1 | 11/2006 | Zohar et al. |
| 2007/0033659 A1 | 2/2007 | Hoche et al. |
| 2008/0126547 A1 | 5/2008 | Waldspurger |
| 2009/0049421 A1 | 2/2009 | Meijer et al. |
| 2009/0276657 A1 | 11/2009 | Wetmore et al. |
| 2009/0288084 A1 | 11/2009 | Astete et al. |
| 2010/0281078 A1 | 11/2010 | Wang et al. |
| 2011/0035548 A1 | 2/2011 | Kimmel et al. |
| 2011/0302371 A1 | 12/2011 | Lysko |
| 2012/0268471 A1 | 10/2012 | Khalvati et al. |
| 2013/0055290 A1 | 2/2013 | Gaikwad et al. |
| 2013/0073523 A1 | 3/2013 | Gounares et al. |
| 2013/0074057 A1 | 3/2013 | Gounares et al. |
| 2013/0124916 A1 | 5/2013 | Shutt et al. |
| 2013/0179630 A1 | 7/2013 | Yano et al. |
| 2013/0232382 A1 | 9/2013 | Jain et al. |
| 2013/0290249 A1 | 10/2013 | Merriman et al. |
| 2013/0297902 A1 | 11/2013 | Collins et al. |
| 2014/0149637 A1* | 5/2014 | Gu .......................... G06F 13/28 711/103 |
| 2014/0164687 A1 | 6/2014 | Kwon et al. |
| 2014/0207955 A1 | 7/2014 | Musial et al. |
| 2014/0324785 A1 | 10/2014 | Gupta et al. |
| 2015/0006788 A1* | 1/2015 | Liu ...................... G06F 3/0685 711/103 |
| 2015/0074350 A1 | 3/2015 | Chiang et al. |
| 2015/0127646 A1 | 5/2015 | Shaw |
| 2015/0188840 A1 | 7/2015 | Xiao et al. |
| 2015/0234617 A1 | 8/2015 | Li et al. |
| 2015/0234719 A1 | 8/2015 | Coronado et al. |
| 2015/0254322 A1 | 9/2015 | Ma et al. |
| 2015/0288669 A1 | 10/2015 | Litoiu et al. |
| 2015/0333994 A1 | 11/2015 | Gell et al. |
| 2015/0347451 A1 | 12/2015 | Lee et al. |
| 2016/0011876 A1 | 1/2016 | Mukherjee et al. |
| 2016/0019286 A1 | 1/2016 | Bach et al. |
| 2016/0132433 A1 | 5/2016 | Hayashi et al. |
| 2016/0170882 A1 | 6/2016 | Choi et al. |
| 2016/0188490 A1 | 6/2016 | Samih |
| 2016/0188898 A1 | 6/2016 | Karinta et al. |
| 2016/0291942 A1 | 10/2016 | Hutchison |
| 2016/0292053 A1 | 10/2016 | Antony et al. |
| 2017/0134337 A1* | 5/2017 | Araújo .............. H04L 61/1511 |
| 2017/0142217 A1* | 5/2017 | Misra ................. H04L 67/1097 |
| 2017/0242958 A1 | 8/2017 | Brown |
| 2017/0244784 A1 | 8/2017 | Lam et al. |
| 2017/0318091 A1 | 11/2017 | Ke et al. |
| 2018/0025092 A1 | 1/2018 | Aharonov et al. |
| 2018/0048712 A1 | 2/2018 | Sarisky et al. |
| 2018/0060237 A1 | 3/2018 | Leslie-Hurd et al. |

FOREIGN PATENT DOCUMENTS

| | | |
|---|---|---|
| JP | 5478526 B2 | 4/2014 |
| WO | WO 2013/024952 A1 | 2/2013 |

OTHER PUBLICATIONS

Apache Sparks: "core concepts, architecture and internals," http://datastrophic.io/core-concepts-architecture-and-internals-of-apache-spark/, Mar. 3, 2016 on Spark (17 pages).

Zaharia, Matei et al., "Spark: Cluster Computing with Working Sets", University of California, Berkeley, HotCloud 10 (2010): 10-10, (pp. 1-7).

Ding, Chen, et al., "Predicting Whole-Program Locality through Reuse Distance Analysis," SIGPLAN Notices, 2003, pp. 245-257.

Liu, Deng, et al., "VFRM: Flash Resource Manager in VMware ESX Server," IEEE Network Operations and Management Symposium (NOMS), 2014, 7 pages.

Liu, Yi et al., "SSD as a Cloud Cache? Carefully Design about It", Shenzhen Institutes of Advanced Technology, Chinese Academy of Sciences, Shenzhen 518055, P.R. China; Department of Computer Science, University of Minnesota, Twin Cities, USA; Shenzhen College of Advanced Technology, University of Chinese Academy of Sciences, Shenzhen 518055, P.R. China, Journal of Computers, vol. 27, No. 1, Apr. 2015 (pp. 26-37).

Luo, Tian et al., "S-CAVE: Effective SSD Caching to Improve Virtual Machine Storage Performance", Proceeding, PACT '13 Proceedings of the 22nd international conference on Parallel architectures and compilation techniques, pp. 103-112, Edinburg, Scotland, UK, Oct. 7, 2013, (10 pages).

(56) References Cited

OTHER PUBLICATIONS

Meng, Fei, et al., "vCacheShare: Automated Server Flash Cache Space Management in a Virtualization Environment," USENIX Annual Technical Conference, 2014, pp. 133-144.
Rajasekaran, Sundaresan, "Multi-Cache: Dynamic, Efficient Partitioning for Multi-Tier Caches in Consolidated VM Environments", Department of Computer Science, The George Washington University, (10 pages).
Ren, Jen, "I-CASH: Intelligently Coupled Array of SSD and HDD", Dept. of Electrical, Computer and Biomedical Engineering, University of Rhode Island, Kingston, RI 02881 (12 pages).
"Spark Programming Guide," *Apache Spark* 2.1.0., https://spark.apache.org/docs/latest/programming-guide.html#rdd-operations.
Tai, Jianzhe, et al., "Improving Flash Resource Utilization at Minimal Management Cost in Virtualized Flash-based Storage Systems," IEEE Transactions on Cloud Computing, 2015, 15 pages.
Wang et al., "A New Scheme for Cache Optimization Based on Cluster Computing Framework Spark", 2015 8th International Symposium on Computational Intelligence and Design (ISCID). vol. 1. IEEE, 2015, pp. 114-117.
Xu, Zhou, et al. "A Dynamic Distributed Replica Management Mechanism Based on Accessing Frequency Detecting," Operating Systems Review (ACM), vol. 38, No. 3, 2004, pp. 26-34; DOI: 10.1145/1035834.1035838.
Venugopal, et al., A Taxonomy of Data Grids for Distributed Data Sharing, Management and Processing, ACM CSUR, vol. 38, No. 1, DOI: 10.1145/1132952.1132955, Jun. 29, 2006, pp. 1-46.
Bu et al., "HaLoop: Efficient Iterative Data Processing on Large Clusters", Proc. of the VLDB, vol. 3, No. 1-2, DOI: 10.14778/1920841.1920881, Sep. 30, 2010, pp. 285-296.
Chiang et al, "An Adaptive IO Prefetching Approach for Virtualized Data Centers," IEEE 2015, 14 pages.
U.S. Office Action dated Aug. 10, 2018, issued in U.S. Appl. No. 15/400,835, 16 pages.
Bocchino Parallel Programming Must Be Deterministic by Default U of Illinois 2009 (Year: 2009).
Etheredge Pure and Deterministic Functions (Year: 2008).
Hellerstein Query Execution Techniques for Caching Expensive Methods 1996 (Year: 1996).
Kanninnura A Speed-up Technique for an Auto Memoization Processor by Reusing Partial Results of Instruction Regions (Year: 2012).
Kathpal Analyzing Compute vs. Storage Tradeoff for Video aware Storage Efficiency (Year: 2012).
Khanafer The Constrained Ski-Rental Problem and its Application to Online Cloud Cost Optimization (Year: 2013).
Ma Way Memoization to Reduce Fetch Energy in Instruction Caches MIT 2001 (Year: 2001).
Mayfield Using Automatic Memoization as a Software Engineering Tool in Real World AI Systems (Year: 1995).
Spark Trademark Evidence (Year: 2018).
Toffola Performance Problems You Can Fix A Dynamic Analysis of Memoization Opportunities 2015 (Year: 2015).
Ziarek Partial Memoization of Concurrency and Communication (Year: 2009).
U.S. Office Action dated Apr. 11, 2018, issued in U.S. Appl. No. 15/404,100 (24 pages).
U.S. Office Action dated Apr. 11, 2018, issued in U.S. Appl. No. 15/404,121 (31 pages).
U.S. Final Office Action dated Feb. 7, 2019, issued in U.S. Appl. No. 15/400,835 (12 pages).
A Stochastic Memoizer for Sequence Data by Wood; International Conference on Machine Learning, Montreal, Canada, 2009. Year: 2009).
U.S. Notice of Allowance dated Dec. 31, 2018, issued in U.S. Appl. No. 15/404,100 (12 pages).
Lecture 18: Dynamic Programming I: Memoization, Fibonacci, Crazy Eights; MIT, Dept of Computer Science and AI; Fall 2009; Available at http://courses.csail.nnitedu/6.006/fal109/lecture notes/lecture18.pdf (Year: 2009).
Intercepting Functions for Memoization: A Case Study Using Transcendental Functions by Suresh (Year: 2015).
U.S. Office Action dated Oct. 17, 2018, issued in U.S. Appl. No. 15/408,328 (10 pages).
U.S. Advisory Action dated Oct. 29, 2018, issued in U.S. Appl. No. 15/404,100, citing the Non-Patent Literature listed above (8 pages).

\* cited by examiner

EFFICIENT DATA CACHING MANAGEMENT IN SCALABLE MULTI-STAGE DATA PROCESSING SYSTEMS

CROSS-REFERENCE TO RELATED APPLICATION

The present application claims priority to and the benefit of U.S. Provisional Patent Application No. 62/384,078, entitled "MEMORY SYSTEM AND METHOD OF USING THE SAME", filed in the United States Patent and Trademark Office on Sep. 6, 2016, the entire content of which is incorporated herein by reference.

FIELD

Aspects of one or more example embodiments of the present invention relate to a system and method for efficient data caching management in scalable multi-stage data processing systems.

BACKGROUND

Improvements in big data analytics and cloud computing in recent years have given rise to systems and infrastructures that enable various entities to host or rent processing clusters to analyze and process data. In a large-scale computing cluster, various big data processing jobs may include a sequence of multiple stages or operations, in which intermediate data is generated after each stage, but the intermediate data may not be saved or stored for subsequent use during subsequent processing jobs.

The above information discussed in this Background section is only for enhancement of understanding of the background of the described technology and therefore it may contain information that does not constitute prior art that is already known to a person having ordinary skill in the art.

SUMMARY

Aspects of one or more example embodiments of the present invention relate to a system and method for efficient data caching management in scalable multi-stage data processing systems.

According to some example embodiments, a system includes: a processor; and a memory coupled to the processor, wherein the memory stores instructions that, when executed by the processor, cause the processor to: receive, from a data source, a processing profile comprising input data blocks and a plurality of operations for executing using the input data blocks; determine whether or not a block of stored intermediate cache data corresponds to an operation from among of the plurality of operations; in response to determining the block of stored intermediate cache data corresponds to the operation from among the plurality of operations, generate a simplified processing profile based on the block of stored intermediate cache data; execute the simplified processing profile by generating a new output data after each operation of the simplified processing profile; store the new output data from at least one operation as intermediate cache data; and transmit the output data from a final operation in the simplified processing profile to the data source for display thereby.

According to some example embodiments, the instructions further cause the processor to, in response to determining the block of stored intermediate cache data corresponds to the operation from among the plurality of operations, identify a location of the stored intermediate cache data among a plurality of worker nodes.

According to some example embodiments, generating the simplified processing profile comprises removing the operation corresponding to the block of stored intermediate cache data.

According to some example embodiments, the simplified processing profile comprises a subset of the plurality of operations of the processing profile without the operation corresponding to the block of stored intermediate cache data.

According to some example embodiments, the instructions further cause the processor to: identify a candidate worker node from among a plurality of worker nodes for storing the new output data according to a load balance calculation of at least one of storage space of each of the worker nodes and input/output bandwidth of each of the worker nodes; and store the new output data at the identified candidate worker node.

According to some example embodiments, the instructions further cause the processor to: identify whether or not there is sufficient space among a plurality of worker nodes to store the new output data; and in response to determining there is not sufficient space among the plurality of worker nodes, clear a block of pre-stored intermediate cache data having a lower priority level than the new output data.

According to some example embodiments, a method includes: receiving, by a processor, from a data source, a processing profile comprising input data blocks and a plurality of operations for executing using the input data blocks; determining, by the processor, whether or not a block of stored intermediate cache data corresponds to an operation from among of the plurality of operations; in response to determining the block of stored intermediate cache data corresponds to the operation from among the plurality of operations, removing, by the processor, the operation from the processing profile to generate a simplified processing profile; executing, by the processor, the simplified processing profile by generating a new output data after each operation of the simplified processing profile; storing, by the processor, the new output data from at least one operation as intermediate cache data; and transmitting, by the processor, the output data from a final operation in the simplified processing profile to the data source for display thereby.

According to some example embodiments, the method further includes, in response to determining the block of stored intermediate cache data corresponds to the operation from among the plurality of operations, identifying, by the processor, a location of the stored intermediate cache data among a plurality of worker nodes.

According to some example embodiments, generating the simplified processing profile includes removing, by the processor, the operation corresponding to the block of stored intermediate cache data.

According to some example embodiments, the simplified processing profile includes a subset of the plurality of operations of the processing profile without the operation corresponding to the block of stored intermediate cache data.

According to some example embodiments, the method further includes identifying, by the processor, a candidate worker node from among a plurality of worker nodes for storing the new output data according to a load balance calculation of at least one of storage space of each of the worker nodes and input/output bandwidth of each of the worker nodes.

According to some example embodiments, the method further includes storing, by the processor, the new output data at the identified candidate worker node.

According to some example embodiments, the method further includes: identifying, by the processor, whether or not there is sufficient space among a plurality of worker nodes to store the new output data; and in response to determining there is not sufficient space among the plurality of worker nodes, clearing, by the processor, a block of pre-stored intermediate cache data having a lower priority level than the new output data.

According to some example embodiments, a method includes: receiving, by a processor, from a data source, a processing profile comprising input data blocks and a plurality of operations for executing using the input data blocks; executing, by the processor, one or more of the operations of the processing profile to generate a new output data after each of the executed one or more operations; storing, by the processor, the new output data from at least one of the one or more operations as intermediate cache data; and transmitting, by the processor, the new output data from a final operation from among the one or more operations to the data source for display thereby.

According to some example embodiments, the method further includes: determining, by the processor, whether or not a block of stored intermediate cache data corresponds to an operation from among of the plurality of operations; and in response to determining the block of stored intermediate cache data corresponds to the operation from among the plurality of operations, removing, by the processor, the operation from the processing profile to generate a simplified processing profile.

According to some example embodiments, the method further includes in response to determining the block of stored intermediate cache data corresponds to the operation from among the plurality of operations, identifying, by the processor, a location of the stored intermediate cache data among a plurality of worker nodes.

According to some example embodiments, the simplified processing profile includes a subset of the plurality of operations of the processing profile without the operation corresponding to the block of stored intermediate cache data, and the method further includes executing, by the processor, each of the plurality of operations among the subset.

According to some example embodiments, the method further includes identifying, by the processor, a candidate worker node from among a plurality of worker nodes for storing the new output data according to a load balance calculation of at least one of storage space of each of the worker nodes and input/output bandwidth of each of the worker nodes.

According to some example embodiments, the method further includes storing, by the processor, the new output data at the identified candidate worker node.

According to some example embodiments, the method further includes: identifying, by the processor, whether or not there is sufficient space among a plurality of worker nodes to store the new output data; and in response to determining there is not sufficient space among the plurality of worker nodes, clearing, by the processor, a block of pre-stored intermediate cache data having a lower priority level than the new output data.

BRIEF DESCRIPTION OF THE DRAWINGS

A more complete appreciation of the present invention, and many of the attendant features and aspects thereof, will become more readily apparent as the invention becomes better understood by reference to the following detailed description when considered in conjunction with the accompanying drawings in which like reference symbols indicate like components, wherein.

DETAILED DESCRIPTION

Figure 1:
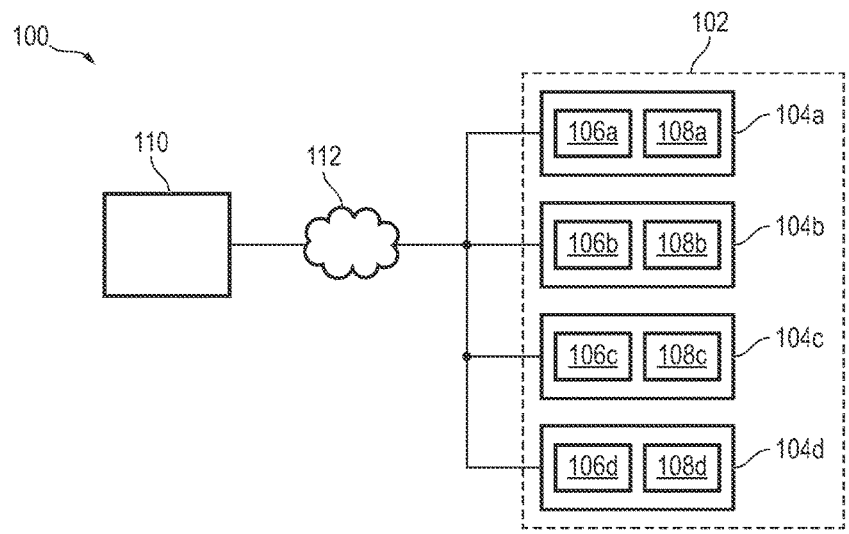
FIG. 1 illustrates a data processing system, according to some example embodiments of the present invention.

Aspects of example embodiments of the present invention relate to a system and method for efficient data caching management in scalable multi-stage data processing systems.

Features of the inventive concept and methods of accomplishing the same may be understood more readily by reference to the following detailed description of embodiments and the accompanying drawings. Hereinafter, example embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element, layer, region, or component is referred to as being "on," "connected to," or "coupled to" another element, layer, region, or component, it can be directly on, connected to, or coupled to the other element, layer, region, or component, or one or more intervening elements, layers, regions, or components may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present invention. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

When a certain embodiment may be implemented differently, a specific process order may be performed differently from the described order. For example, two consecutively described processes may be performed substantially at the same time or performed in an order opposite to the described order.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

With the rise of big data analytics and cloud computing, more and more companies hos or rent processing clusters to analyze various types of data to improve their business. In a large-scale computing cluster, large data processing jobs include a sequence of processing stages, where each stage represents or corresponds to a generally defined data operation or transformation. For example, each stage may execute operations such as filtering, merging, sorting, and mapping of data. For a sequence of multiple stages corresponding to an overall processing job, intermediate data are created or generated from each stage except for the final stage. When such intermediate data is generated and then deleted, it may not be reused or shared by other jobs. In many circumstances, however, the intermediate data, if not deleted, would be usable by other processing jobs, for example, when subsequent jobs include stages that have the same input data and operations. Therefore, deletion of the intermediate data may lead to inefficiencies in terms of the use of resources for the processing cluster.

As will be described in more detail below, embodiments of the present invention may be configured to harness the data sharing among data processing stages across different jobs or operations to avoid or reduce instances of redundant data processing. For example, embodiments of the present invention may operate to identify different stages that utilize the same input data and perform the same processing operation, but serve different jobs. By sharing data between different stages that are executing the same or similar function on the same or similar input, the system may reduce the overall amount of system resources by executing only one of these stages, storing the output data as intermediate cache data, then enabling the subsequent stages to utilize the output data and proceed to the next stage for their corresponding job.

Embodiments of the present invention may further utilize an efficient cluster-wide caching scheme for hosting the intermediate data to support consecutive data sharing. This scheme may operate, for example, by utilizing aspects of a cluster-based caching system, described in more detail below.

Some embodiments of the present invention include a mechanism for describing data dependency for each stage in a job's profile. When a job is submitted to the processing cluster, according to some embodiments of the present invention, the profile or metadata of the job includes additional information describing the data dependency of each stage thereby enabling sharing of intermediate cache data.

Some embodiments of the present invention include an architecture of a cluster-based caching system based on a paralleling big-data processing system.

Some embodiments of the present invention include an efficient cluster-wide caching scheme for hosting the intermediate data to support consecutive data sharing. This scheme may be operated by utilizing the architecture of a cluster-based caching system. Embodiments of the present invention may first examine and analyze the executions of representative big data processing jobs, understand and model the characteristics of data access (especially the intermediate data access), and then simplify the stages of jobs by reusing the intermediate data in the cache system.

Some embodiments of the present invention include cluster-based caching system on a big data processing platform for intermediate data sharing and reuse by different applications, which may significantly improve the overall performance of the platform.

FIG. 1 illustrates a data processing system 100 according to some example embodiments of the present invention. As shown in FIG. 1, the data processing system 100 includes a data processing cluster 102, which includes a plurality of nodes 104a-104d (the number of nodes 104a-104d is not limited to the number illustrated in FIG. 1, and may include fewer or additional nodes according to the design of the data processing system 100). Each of the nodes 104a-104d may be in electronic communication with one another, for example, through a local area network (LAN), private wide area network (WAN), and/or a public wide area network such as, for example, the Internet, in a wired or wireless configuration.

Each of the nodes 104a-104d includes a processor 106a-106d, respectively. Additionally, each of the nodes includes a memory 108a-108d, respectively. The memories 108a-108d may include volatile memory (e.g., random access memory (RAM), such as dynamic RAM) and non-volatile memory (e.g., a hard disk drive (HDD)), which may serve as long-term storage. Different nodes 104a-104d may be distributed across various geographic or system locations. For example, according to some embodiments, one or more nodes 104a-104d may be located at a same general geographic location (for example, in the same server rack), while one or more nodes may be located at a different geographic location.

Collectively, according to embodiments of the present invention, the data processing cluster 102 operates as a distributed data processing system using any suitable cluster computing framework known in the art. For example, according to some embodiments of the present invention, the distributed data processing cluster or system 102 may operate within the Apache Spark framework, and/or may provide a functional application programming interface (API) for manipulating data at scale, in-memory data caching and reuse across computations.

The data processing cluster 102 may further be in electronic communication with one or more data sources or users 110 over a communication network 112. That is the data sources or users 110 may be located remotely or externally with respect to the data processing cluster 102. The communication network 112 may be for example, a LAN, private WAN, and/or a public WAN such as, for example, the Internet. According to some embodiments, the data source 110 may also be local with respect to one or more of the nodes 104a-104d. According to embodiments of the present invention, the data processing cluster 102 is configured to receive a data processing job profile and input data from the data source 110, execute the data processing job on behalf of the data source 110, and return a result of the data processing job to the data source 110, as will be described in more detail herein. According to some embodiments, the data source or user 110 may include, for example, a computer system including a processor and a memory (similar to 106 and 108), one or more user input devices, and a display panel for displaying information (e.g., output data received from the data processing cluster 102).

According to some embodiments of the present invention, a node in the data processing cluster 102 (e.g., the node 104a) is designated or operates as a master node, and other nodes (e.g., nodes 104b-104c) are designated or operate as worker nodes. The master node is responsible for managing worker nodes and scheduling the jobs. Worker nodes are responsible for data storing and task execution.

According to some embodiments of the present invention, a data source or user 100 submits a job to the data processing cluster 102 through the master node. One job is then split into multiple tasks or operations and one task is assigned one block of input data. During execution of a job, one piece of intermediate data is created after each stage or operation until the final output data is generated following the final stage or operation of the job. The intermediate data is the output data from each intermediate stage or operation of the data processing job, and also serves as the input data of the next stage. After a data processing job is completed, according to embodiments of the present invention, intermediate data may be stored as intermediate cache data for reuse and/or sharing for other jobs.

Thus, as will be described in more detail below, embodiments of the present invention operate to harness data sharing among data processing stages across different jobs to avoid redundant data processing. In particular, embodiments of the present invention operate to identify stages of different data processing jobs that receive the same input data and perform the same processing operation, and then re-use or share the intermediate data among the different jobs.

By enabling sharing of the intermediate data, the data processing cluster 102 may reduce the overall system data processing, because repetitive instances of performing a particular operation on particular input data may be reduced or eliminated altogether. For example, after a particular data processing job executes a stage or operation having a particular input data, the output of the stage may be stored as intermediate cache data, and subsequent data processing jobs that have the same stage or operation with the same input data can simply utilize the intermediate cache data as the input for the next stage in their respective sequence of stages, rather than re-executing the operation that was already executed for the previous data processing job.

As part of the data processing system 100, embodiments of the present invention may include an enhanced job profile to describe the input data and the operations of all the stages so that the data processing cluster (e.g., the data processing cluster 102) can identify data processing jobs with the same input data and the same or similar operations. Additionally, as will be described in more detail below, embodiments of the present invention may include a cluster-based caching system or mechanism operating as part of the data processing cluster to manage the cached intermediate data, work with other components in the cluster to simplify the operations of new jobs, and provide and/or retrieve the intermediate cache data for reuse by subsequent data processing jobs. Further, embodiments of the present invention further include schemes for supporting sharing of intermediate cache data for subsequent jobs and for allocating or distributing the intermediate cache data in memory of the various nodes in the data processing cluster.

According to embodiments of the present invention, a data processing cluster (e.g., the data processing cluster 102) may have H worker nodes (including, e.g., nodes 104b-104d). Thus, the set N of worker nodes may be represented as N: N={$n_1, n_2, \ldots, n_H$}. If S is the storage capacity and B is the maximum IO bandwidth for intermediate data caching in each worker node, then the set S': {$s_1, s_2, \ldots, s_H$} and the set B': {$b_1, b_2, \ldots, b_H$} represent the collective remaining capacities and IO bandwidth of each worker node for caching, respectively.

According to embodiments of the present invention, a data processing job submitted to the data processing cluster, includes two elements: the input data and a list of operations to be executed upon the input data to generate the final output data. The input data contains a list of data blocks $\vec{D}$; {$D_i | i \in [1, N]$}, where $D_i$ represents the data block ID and N is the number of data blocks. Thus, the input data includes a set or list of data blocks, each having a corresponding data block ID (e.g., ranging from 1 to N, where N is the total number of data blocks). Additionally, the operation list $\vec{O}$; {$O_i | i \in [1, M]$}, where $O_i$ is the operation ID in stage i, and M is the number of stages or operations for the data processing job. According to embodiments of the present invention, both the data block ID and the operation ID are unique in the data processing cluster. For example, {{block1}, {op1, op2}} shows a data processing job with one data block block1 and two operations op1 and op2.

According to embodiments of the present invention, the data processing cluster 102 stores two tables of data, an operation table and a cache information table.

The operation table stores the input data for different stages, the operations executed for each stage, and the intermediate cache data for each stage. For example, according to some example embodiments of the present invention, an example operations table includes three columns, as illustrated in Table 1, below. A first column of the operation table may include a block list of input data, may include an operation list for each stage, and a third column may include a list of cached intermediate data blocks. Thus, for a table with K rows, the elements in the operations table may be a collection of three 2-D vectors which can be represented as: ($\vec{I}, \vec{P}, \vec{C}$), where $\vec{I}$; {$\vec{I}_i | i \in [1, K]$}, $\vec{P}$: {$\vec{P}_i | i \in [1, K]$}, and $\vec{C}$: {$\vec{C}_i | i \in [1, K]$}. For a list of cached data blocks $\vec{C}_i$ row i of the table, $\vec{I}_i$ is the list of original input data blocks and $\vec{P}_i$ is related the operation list. For instance, Table 1 shows the record in the operation table of a completed data processing job j1 whose intermediate data have been saved in the cache system. The input data of j1 contains two blocks: block1 and block2. There are three stages in j1 with operation IDs op1, op2, and op3. cache1 and cache2 are the cache IDs of the intermediate data after stage 1 and stage 2. There are two data blocks created after the third stage, cache3 and cache4. Additionally, the operation ID is unique for each operation and the cache ID is unique for each cached data block in the cache cluster. The original input data may be either the data saved in a distributed file system (DFS) of the data processing cluster or intermediate cache data stored in a cluster-based cache system of the data processing cluster.

TABLE 1

| Original Input Data | Operation List | Cached Intermediate Data List |
|---|---|---|
| {block1, block2} | {op1} | {cache1} |
| {block1, block2} | {op1, op2} | {cache2} |
| {block1, block2} | {op1, op2, op3} | {cache3, cache4} |

A second table stored as part of the data processing cluster 102 is the cache information table. The cache information table may be stored, for example, in a Cache Master memory of a master node, and includes a record for the location of each list of cache blocks and the priority of the cache list. According to some embodiments, a score may be utilized to represent a priority of a cached data list where, for example, the higher the score, the higher the priority is. Certain intermediate cache data may have a higher priority than other intermediate cache data, for example, if the intermediate cache data is utilized more frequently, utilizes more system resources to generate, and the like.

The cache information table may be formatted, for example, to include three columns as: ($\vec{C}, \vec{W}, \vec{E}$), where $\vec{C}$: {$\vec{C}_i | i \in [1, K]$}, $\vec{W}$: {$W_i | i \in [1, K]$} and $\vec{E}$: {$E_i | i \in [1, K]$}. The cache information table may have the same number of rows as the operation table, represented as K. The collection of cache data lists $\vec{C}$ is the same as the one in the operation table. For the list of cache data IDs $\vec{C}_i$ in row i, $\vec{W}$ shows the node IDs of the data worker which contain this cache list and the score of the cache list is $E_i$. Table 2, below, shows an example of a cache information table.

TABLE 2

| Cached Intermediate Data List | Data Worker List | Priority |
|---|---|---|
| {cache1} | worker1 | score1 |
| {cache2} | worker2 | score2 |
| {cache3, cache4} | worker3 | score3 |

In addition to the cache information table and operation table, according to some embodiments of the present invention, a data processing job request from a user may include a data processing job profile, which includes information data dependency. Each stage in a data processing job may, for example, only have one input data. For example, the input data for an individual stage in a data processing job may be the original input data provided with the data processing job request from the data source or user, or may be intermediate data generated from the immediately preceding stage. Additionally, each stage may, for example, only have one output data which is provided as the only input to the next stage or constitutes the final output data for the data processing job. Thus, according to embodiments of the present invention, data processing jobs received from different data sources or users may share the same input data (or intermediate data) and one or more common processing stages. Embodiments of the present invention enable common stages, with common input, from different data processing jobs to be executed fewer times (e.g., only one time) and the output data and/or intermediate data can be shared among the different data processing jobs.

According to some embodiments of the present invention, a job profile for a data processing job is transmitted to the data processing cluster 102 from the data source or user 110, which specifies the data input for each stage, thereby enabling data sharing for multiple data processing jobs. When submitting a data processing job, the data source or user 110 creates and transmits the job profile to the cluster master (e.g., the node 104a) of the data processing cluster 102 with the original input data files and a list of operations of all of the stages in the data processing job. According to some embodiments of the present invention, the job profile includes unique data file names and each operation has a unique operation ID. Such job profiles can be managed by the cluster master (e.g., of the master node) for the further scheduling.

Figure 2:
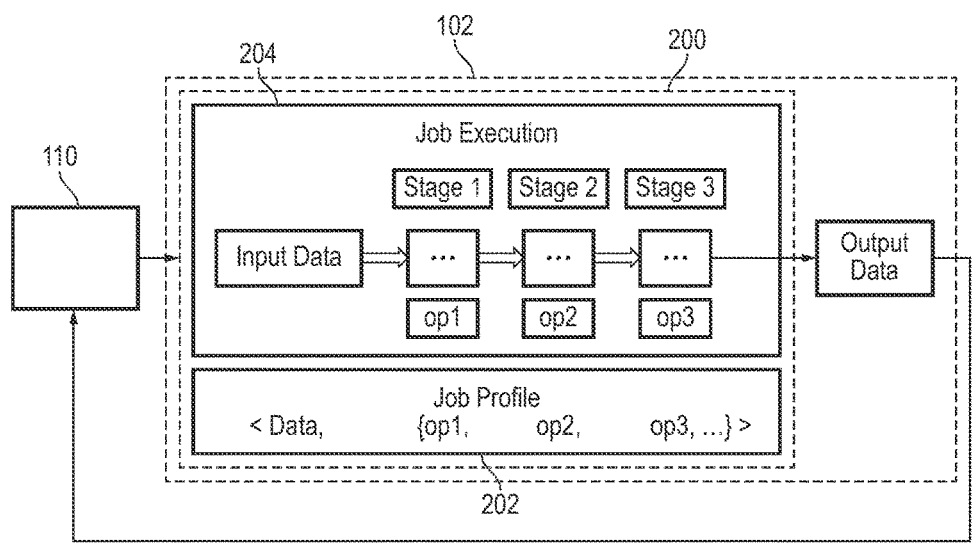
FIG. 2 depicts an example data processing job transmitted from a data source to a data processing cluster, according to some example embodiments of the present invention.

FIG. 2 depicts an example data processing job 200 transmitted from a data source (e.g., the data source 110) to a data processing cluster (e.g., the data processing cluster 102) according to some example embodiments of the present invention. The data processing job 200 includes a sequence of processing stages (e.g., stages 1-3), and each stage represents a generally defined data operation or transformation (e.g., op1, op2, op3, etc.) such as filtering, merging, sorting, and mapping. The data processing job 200 includes a job profile 202, for example, where op1, op2, and op3 represent the operation IDs of the data operations in stage 1 to stage 3.

As is described in more detail below, when a new data processing job is submitted to or received by the data processing cluster 102, the data processing cluster 102 may analyze the job profile to determine whether or not the data processing cluster 102 already has intermediate cache data that can be reused for the present data processing job. Additionally, the cluster master (e.g., of the master node) maintains a table to track the locations of all the cached data. If the data processing cluster 102 identifies intermediate cache data that is already stored in the data processing cluster 102, the data processing cluster 102 may simplify the data processing job, for example, by removing stages or operations from the job execution path 204 where the output data for the stages is already stored as intermediate cache data. The stage(s) following any removed stages then are provided with the stored intermediate cache data as input data, thereby reducing the overall resources utilized for the data processing job.

Figure 3:
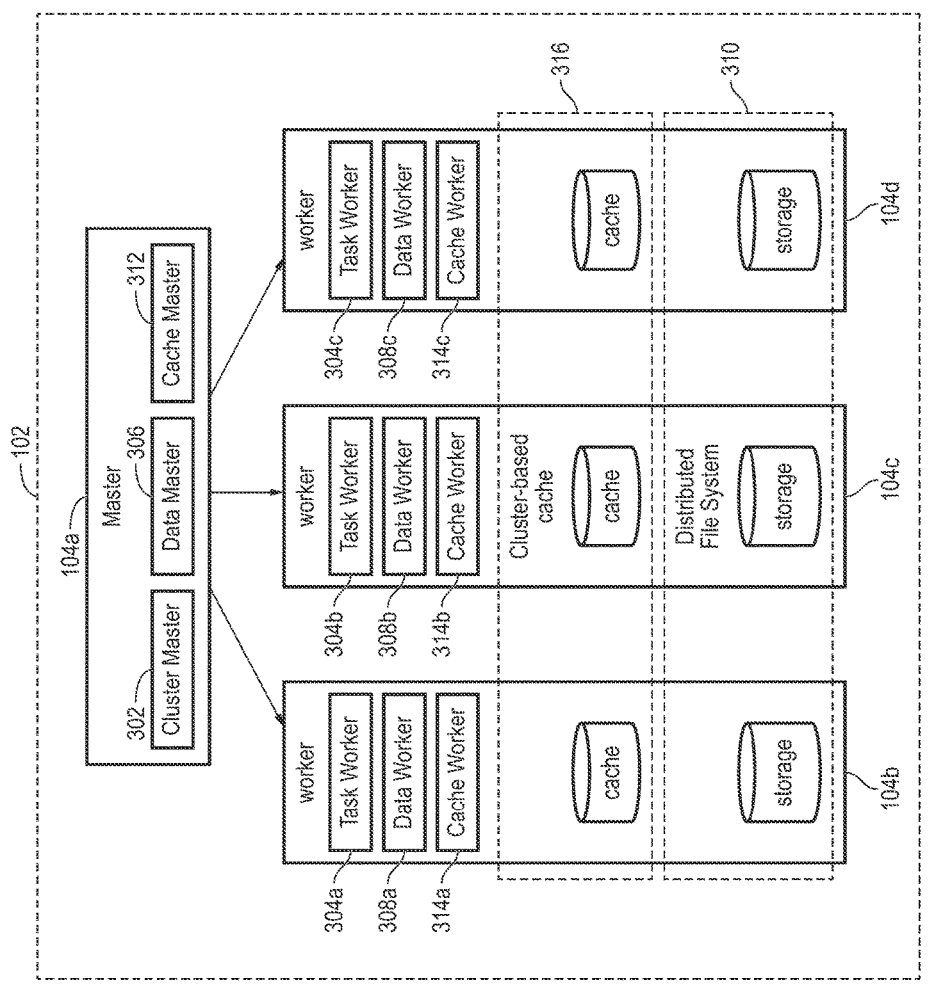
FIG. 3 illustrates a block diagram showing aspects of an example architecture of a data processing cluster, according to some example embodiments of the present invention.

FIG. 3 illustrates a block diagram showing aspects of an example architecture of a data processing cluster according to some example embodiments of the present invention.

Embodiments of the present invention utilize a cluster-based cache system with one cache master operating as part of a master node (e.g., the node 104a) and a plurality of cache workers operating as part of a plurality worker nodes (e.g., the nodes 104b-104d) in the data processing cluster 102.

The Cluster Master 302 and Task Workers 304a-304c, of the master node (e.g., the node 104a) and the worker nodes (e.g., the nodes 104b-104d), respectively, are responsible for executing the stages of a data processing job. For example, the Cluster Master 302 may schedule the data processing jobs and assign resources for different tasks or operations executed as part of a data processing job. The Task Workers 304a-304c may execute the assigned tasks and update the resource availability of their corresponding worker node to Cluster Master 302.

Additionally, the Data Master 306, of the master node, and the Data Workers 308a-308c, of the worker nodes, are responsible for storing data. The data processing cluster 102 may further include a distributed file system (DFS) 310 for distributing data storage across the memory of each of the worker nodes. The metadata of the file system may be managed in the Data Master 306 and the data itself may be stored by the Data Workers 308a-308c (e.g., in the distributed file system 310). When clients or a Task Worker requires data, they will request the Data Master to get the location of the data.

According to embodiments of the present invention, the master node (e.g., the node 104a) may include a cache master 312, which communicates with other components in the master node and send writing/reading cache requests to the cache workers 314a-314c of the worker nodes. The cache workers 314a-314c update the resource capacities of their corresponding worker node to the Cache Master 312 and execute the writing/reading requests from the Cache Master 312, for example, by storing intermediate cache data in a cluster-based cache 316 and reporting the location and nature of the stored intermediate cache data to the cache master 312.

Figure 4:
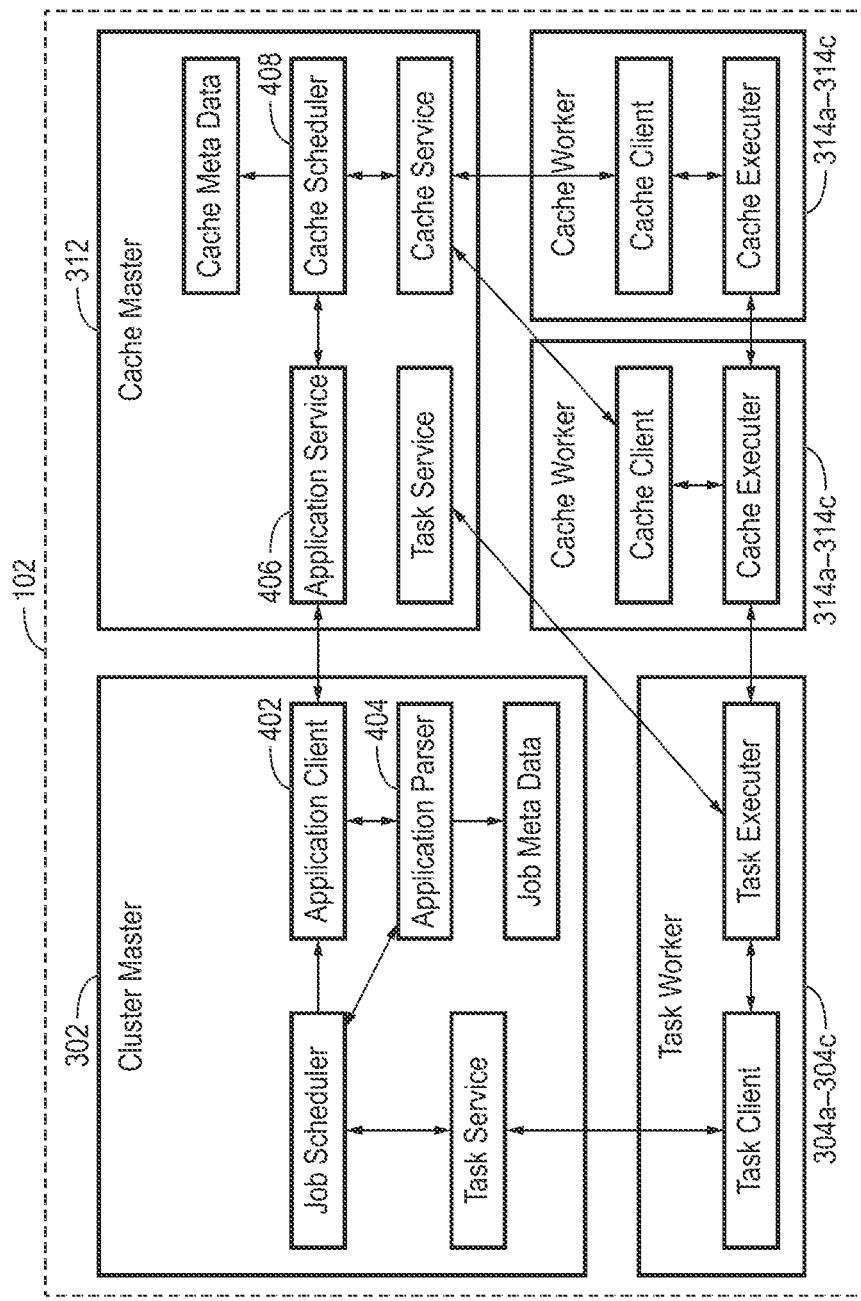
FIG. 4 illustrates further details of a data processing cluster, according to some example embodiments of the present invention.

FIG. 4 illustrates further details of a data processing cluster according to some example embodiments of the present invention.

According to some embodiments, the cluster master 302 in the master node is responsible for scheduling applications and managing task workers. A data processing job is divided into multiple tasks or operations by the cluster master 302, and these tasks or operations will be assigned to the task workers by the cluster master 302, according to any suitable task assignment and distribution scheme.

According to some embodiments of the present invention, the cluster master 302 may further include an Application Client 402 and an Application Parser 404.

According to some embodiments of the present invention, the Application Client 402 operates as a communication mechanism between the cache master 312 and the cluster master 302. When a data processing job request is submitted to and/or received by the cluster master 302, a job profile may be recorded in a job metadata table. The job metadata table may, for example, include three columns: a Job ID column, an Input Data column, and an Operation List column, as illustrated in Table 3 below.

The Job ID column stores unique IDs for each data processing job submitted to the data processing cluster. The Input Data column stores a list of input data blocks for each data processing job. Each input data block may be stored, for example, in the DFS of the data processing cluster 102 with a unique block ID. The operation list column includes a the list of operation IDs for a data processing job in each stage.

Table 3 illustrates an example format of a data processing job profile, where j0, j1 and j2 are the job IDs of three different data processing jobs, block1 and block2 are the block IDs of the input data, and op1, op2, and op3 are the operation IDs.

TABLE 3

| Job ID | Input Data | Operation List |
|--------|------------|----------------|
| j0 | {block1} | {op1} |
| j1 | {block1} | {op1, op2} |
| j2 | {block1, block2} | {op1, op2, op3} |

For a given data processing job, the Application Client 402 transmits the data processing job profile to the Cache Master 312 to determine whether or not there are intermediate cache data is already stored by the data processing cluster 102 that can be shared. If such intermediate cache data exists, the Cache Master 312 transmits the cache ID and its location (e.g., the data location among the nodes) to the application client (e.g., by way of an application service block).

In the case where intermediate cache data is available for sharing, the Application Parser 404 operates to simplify the operations of a job depending on the response from the cluster master of the cached intermediate data, by removing stages or operations from the job at hand. For example, if j0 is completed and its output data is cached with a unique cache ID cache0, the metadata of j1 can be simplified as illustrated in Table 4, below.

TABLE 4

| Job ID | Input Data | Operation List |
|--------|------------|----------------|
| j1 | {cache0} | {op2} |

According to embodiments of the present invention, the Task Worker in each worker node executes the tasks assigned by the cluster master 302. A Task Client block of the task worker may operate to maintain a heartbeat with Cluster Master 302, to report the resource utility of the worker node, and to receive the commands from the Master node. Each task worker 304a-304c may further include one or more Task, where each Task Executer executes one task at a time. The Task Executers request the data location from the data master and read/write data to the Data Worker.

Additionally, according to embodiments of the present invention, when a task is assigned to a task worker, the task worker identifies the type or nature of the input data. For example, if the input data is a block in the DFS, the task worker will request the data from Data Master and Data Executer. If the input data is a block of intermediate cache data, the task worker will send the cache ID to the Cache Master and request the location of the cache data. After the task worker receives the input data location, the task worker will read the data from the Cache Executer. The output data of a Task Executer will be written into cache or DFS according to the priority of the data and the capacity of the cache.

According to some embodiments of the present invention, the cache master may include four blocks, components or modules: Application Service, Cache Service, Task Service and Cache Scheduler. Application Service 406 communicates with the Cluster Master 302. Such communication may be based on any suitable communication protocol, such as RPC protocol (Remote Procedure Call Protocol). When a data processing job submitted to or received by the application master, the data processing job profile may be reported to the cache master 312 by way of the application client 402 and the application service 406.

A cache service block communicates with the Cache Worker in each worker node. Such communication may also be based on any suitable communication protocol, such as an RPC protocol. A heartbeat mechanism is maintained between the Cache Service and the Cache Worker periodically. Via a heartbeat, the Cache Worker may report to the Cache Master the resource capacities of the worker node including CPU, Memory, Cache and Storage utilities and responses whether a cache writing/deleting command is successfully executed. Additionally, the Cache Master may transmit writing/deleting cache messages to the cache worker by way of the heartbeat communication. If the Cache Master cannot receive the heartbeat from a Cache Worker for a period of time (e.g., a predetermined period of time, e.g., 10 minutes), the Cache Worker will be removed from the cache cluster.

A Cache Scheduler block 408 may execute cache management operations such as writing, reading, and deleting. For example, while caching a piece of data, the cache scheduler 408 may calculate the priority for the data (represented as a score) in the entire cache cluster and then select one or more appropriate Cache Workers to execute the writing commands to store the cache data. Additionally, when cached data is read from the data processing cluster 102 as part of a data processing job, the Cache Scheduler block 408 may operate to retrieve the cached data from the corresponding Cache Worker node.

Further, according to some embodiments, in order to improve the hit ratio of prestored or cached data, thereby improving the utility of the system, if the cache capacity of the entire data processing cluster is full, the Cache Scheduler 408 may cache data having a low priority (e.g., the lowest priority) in favor of storing or caching data having a higher priority.

The relative priority value (represented as a score) of cache data or potential cache data may be determined based on a probability of future accesses of the data. For example, more frequently accessed data may be assigned a higher priority value. Additionally, the relative priority value of cache data or potential cache data may be determined based on reconstruction costs for generating or obtaining the data in the future. For cached intermediate data, the reconstruction cost indicates the penalty if the data is completely evicted out of the cluster. Therefore, data with a higher reconstruction cost may be assigned a higher priority value. Further aspects of calculating and assigning the priority score for cached data or potential cache data is described in further detail in U.S. patent application Ser. No. 15/404,121, entitled "In-memory Shared-Intermediate Data Reuse Replacement and Caching," filed on Jan. 11, 2017, and U.S. patent application Ser. No. 15/404,100, entitled "A Duplicate In-Memory Shared-Intermediate Data Detection and Reuse Module in Spark Framework," filed on Jan. 11, 2017 the entirety of both of which is incorporated by reference herein.

In addition, the Cache Master 312 maintains two metadata tables: the operation table and the cache information table, described above. Once the intermediate data of a completed job is saved in the cache system successfully or any cached data is deleted, both tables are updated by the cache master 312.

Figure 5:
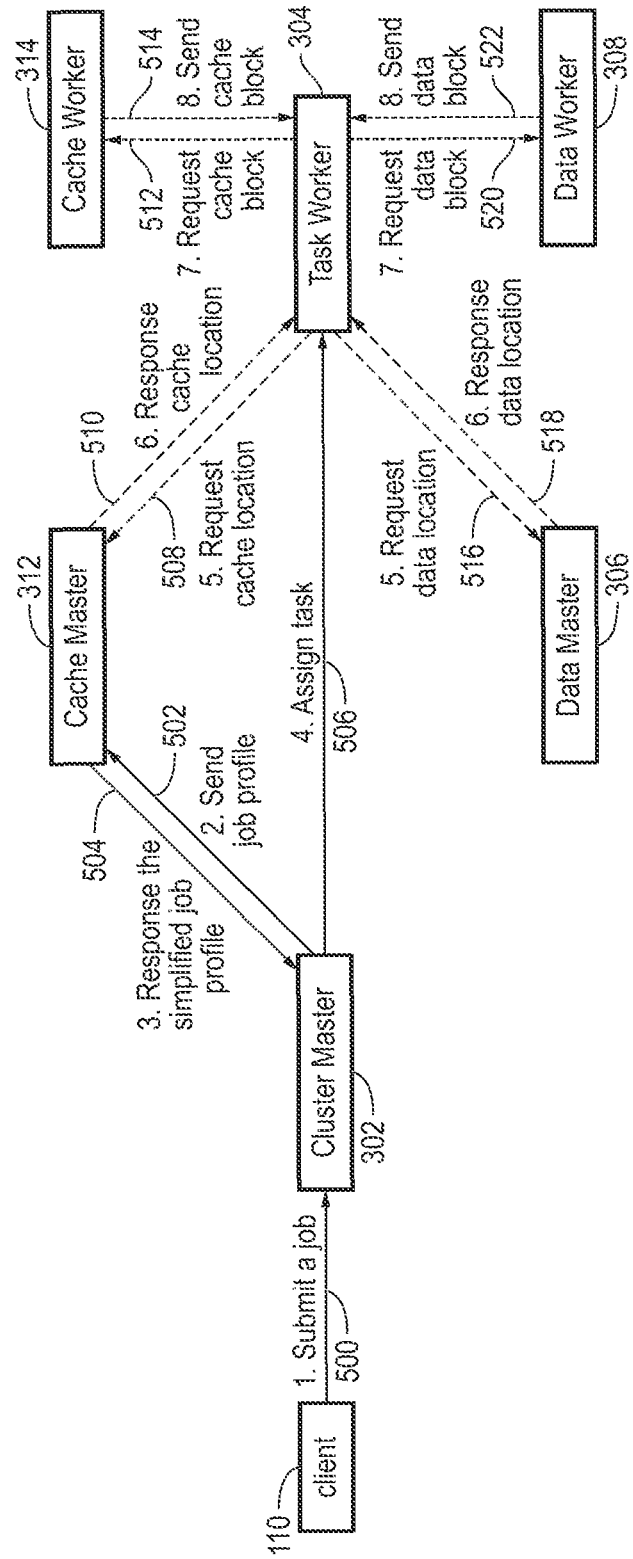
FIG. 5 illustrates further details of the workflow described above for a data processing job, according to example embodiments of the present invention.

FIG. 5 illustrates further details of the workflow described above for a data processing job, according to example embodiments of the present invention. At 500, a data source 110 transmits, and the cluster master 302 receives, at operation 500, a data processing job, including input data, and the data processing job profile and one or more operations to be performed as part of the data processing job, as described above. When the cluster master 302 receives a submitted data processing job, the cluster master 302 may transmit, at operation 502, the job profile as originally received (e.g., the enhanced job profile) to the cache master 312, for determining whether or not the data processing job can be simplified. The cache master 312 may then initiate a search from among the stored intermediate cache data to determine whether or not any of the stored intermediate cache data corresponds to any operations of the data processing job (e.g., such that the stored intermediate cache data corresponds to a same input data and a same operation). If there is stored intermediate cache data in the cache system which can be reused by the job, at operation 504, the cache master 312 may transmit the locations (e.g., within the cluster-based cache memory) of the stored intermediate cache data, the stored intermediate cache data itself, and/or a simplified job profile for which the redundant operations are substituted with the stored intermediate cache data. At operation 506, the cluster master 302 may generate and/or assign tasks for the job profiled (e.g., the updated job profile) and assigned to task workers 304 to execute the operations of the job. If any aspect, operation, or intermediate stage of the data processing job relies on retrieving stored intermediate cache data from the cache memory, the individual task workers may, at operation 508, transmit a request to the cache master 312 the cache location of the stored intermediate cache data. The task workers 304 may then, at operation 510, receive from the cache master 312 the cache location within the cluster-based cache 316. The task workers 304 may then request to, and receive from, respectively at operations 512 and 514, the previously stored intermediate cache data from the corresponding cache worker 314. Similarly, if any aspect, operation, or intermediate stage of the data processing job relies on retrieving data from a data worker 308, the individual task workers may, at operation 516, transmit a request to the data master 306 the data location of the data. The task workers 304 may then, at operation 518, receive from the data master 306 the data location within the corresponding data worker 308. The task workers 304 may then request to, and receive from, respectively at operations 520 and 522, the data from the corresponding data worker 308.

Figure 6:
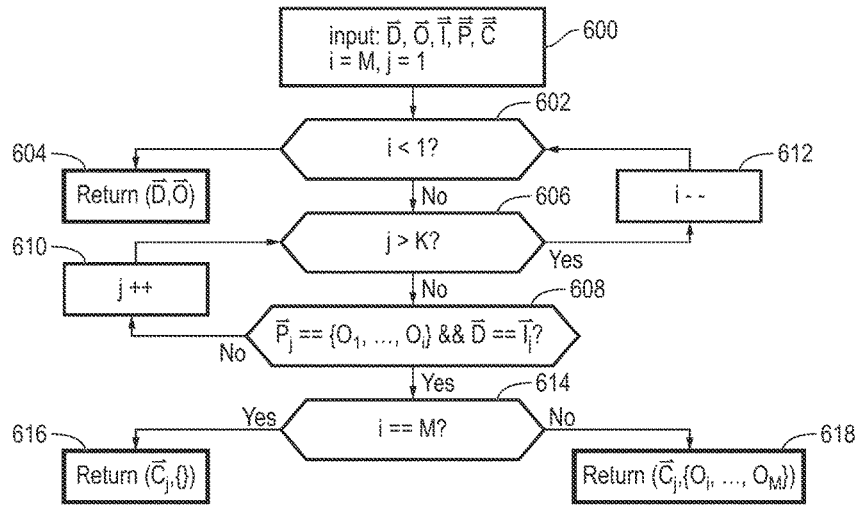
FIG. 6 illustrates aspects of a process or function for simplifying a data processing job, according to some example embodiments of the present invention.

FIG. 6 illustrates aspects of a process or function for simplifying a data processing job in Cache Master, according to some example embodiments of the present invention. Referring to FIG. 6, at operation 600, input data and data processing job profile data is received (e.g., received by the cluster master) from an input source (e.g., data source 110). Referring to the input data that may be received at operation 600, $\vec{D}$ is the list of input data blocks and $\vec{o}$ is the list of operations of a job. The number of operations is M, and the number of records (e.g., rows) in the operation table is $\vec{I}, \vec{P}, \vec{C}$ represent the original input data, the operation list, and the cached intermediate data of the operation table in Cache Master, respectively.

The system may then determine, at operation 602, whether or not a counter i, initially set to be equal to the number of operations, is less than 1. If the counter i is less than 1, the system may return the list of input data blocks and the operations list, at operation 604, after which the system will proceed with processing the returned list of input data blocks and the operations list as the simplified data processing job. Otherwise, at operation 606, the system may determine whether or not a counter j, initialized at 1, is greater than the number of entries in the operation table of the operations list.

At operation 608, the system may iterate through the table of cached intermediate data to determine whether or not any of the operations, and corresponding input data, from the input list of operations matches the cached intermediate data. In the process, the system may proceed at operations 610 and 612, to increment the counter j and decrement the counter i, respectively, after evaluating each operation and the corresponding input data block to determine whether or not there is a corresponding stored intermediate cache data entry. If there is a corresponding stored intermediate cache data entry, the operation is removed from the job profile, and the cached intermediate data that would have been generated by the removed operation is retrieved in its place. Once each operation and corresponding input data has been evaluated to determine whether pre-stored intermediate cached data already exists, the system may return, at operations 616 or 618, the simplified data processing job. At operation 616, the simplified data processing job may include the set of intermediate cache data resulting from each of the operations being removed. At operation, 618, the simplified processing job may include the set of intermediate cache data obtained during the simplification process, plus the remaining operations for which the data was not already stored as pre-stored intermediate cache data. Process 1, below, also illustrates the algorithm of FIG. 6 in pseudo code.

Figure 7:
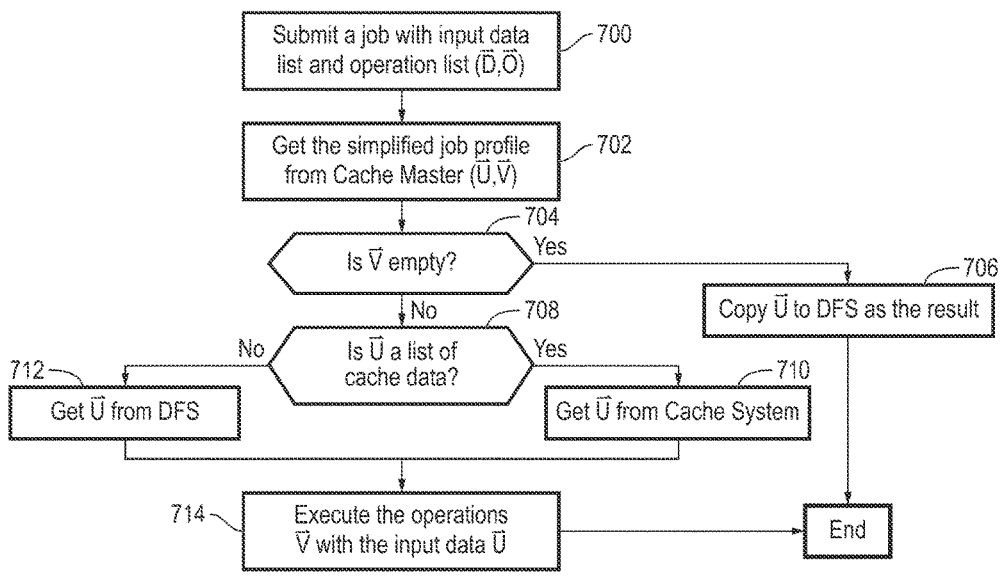
FIG. 7 illustrates aspects of a process or function for executing a data processing job according to some example embodiments of the present invention.

FIG. 7 illustrates aspects of a process or function for executing a data processing job according to embodiments of the present invention. At operation 700, a data processing job, including input data D and an operations list O to be executed as part of the data processing job, is submitted to the system (e.g., the cluster master) from a data source. After a job profile is submitted to or received by the data processing cluster, the data processing cluster may generate a simplified job profile, at operation 702, in which certain operations or stages may be removed as described above, for example, with respect to FIG. 6. As illustrated at operation 702, U is the input data of the simplified data processing job profile, and V is the simplified operations list. At operation 704, the system determines whether or not the set or list of simplified operations is empty or zero, and if so, at operation 706, the system may simply utilize or copy the corresponding cached intermediate data as the final output and the data processing job is completed. If, at operation 704, the system determines the simplified operations list is not empty, system may determine, at operation 708, to determine whether or not the input data U of the simplified job profile includes intermediate cache data. If so, at operation 710, the system may proceed to retrieve the input data U from the cluster-based cache memory. Alternatively, if the input data U includes data stored in the distributed file system, the system may, at operation 712, retrieve the input data U from the distributed file system. Then, at operation 714, the system may proceed with executing the simplified operations V by utilizing the input data U. Process 2, below, also illustrates the algorithm of FIG. 7 in pseudo code.

| Process 1: simplifyJob | |
|---|---|
| 1 | Procedure simplifyJob( ) |
| 2 | Input Data: $\vec{D}, \vec{O}, \vec{I}, \vec{P}, \vec{C}$ |

| Process 1: simplifyJob | |
|---|---|
| 3 | for i = M to 1 do |
| 4 |    for j = 1 to K do |
| 5 |       if $\vec{P}_j$ == $\{O_1, \ldots, O_i\}$ then |
| 6 |          if $\vec{D}$ == $\vec{I}_j$ then |
| 7 |             if i == M then |
| 8 |                return ($\overline{C}_j$, { }) |
| 9 |             else |
| 10 |                return ($\overline{C}_j$, $\{O_i, \ldots, O_M\}$) |
| 11 | return ($\vec{D}, \vec{O}$) |

| Process 2: jobExecution( ) | |
|---|---|
| 1 | Procedure jobExecution( ) |
| 2 | ($\vec{U}, \vec{V}$) = simplifyJob( ) |
| 3 | if $|\vec{V}|$ == 0 then |
| 4 |    copy $\vec{U}$ to DFS as the result |
| 5 | else |
| 6 |    if $\vec{U}$ is cache data then |
| 7 |       get $\vec{U}$ from cache system |
| 8 |    else |
| 9 |       get $\vec{U}$ from DFS |
| 10 | Execute the operations $\vec{V}$ with input data $\vec{U}$ |

Figure 8:
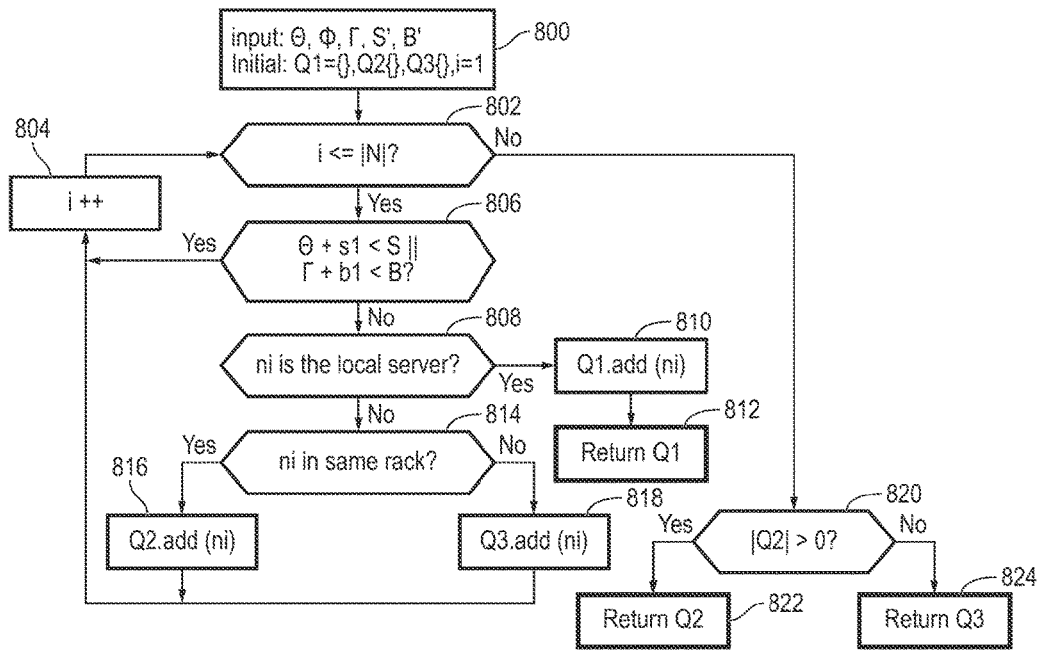
FIG. 8 illustrates aspects of a process for selecting candidates for storing intermediate cache data, according to some example embodiments of the present invention.

As illustrated in FIG. 8, after a data processing job is completed (or during execution of a data processing job), before the data processing cluster deletes all intermediate data, the cache master may check the available cache capacity of the cache cluster, identify a priority of intermediate data generated as part of the data processing job, and store some or all of intermediate data in the cache memory of the worker nodes. All newly created intermediate data from all stages may be sorted by their priority score in descending order and the system may request to store or determine whether or not to store the intermediate data in the cache system one by one. For the intermediate data from one stage, if there are more than one worker nodes with enough space, the cache master may select a node to complete storage of the intermediate cache data, for example, based on input/output bandwidth or demand of each node, and/or available cache memory space in each node. For example, the data processing cluster may select a node based on a determination of which node will provide the most even balance of I/O bandwidth or demand and/or available cache memory space from among all of the nodes.

Figure 9:
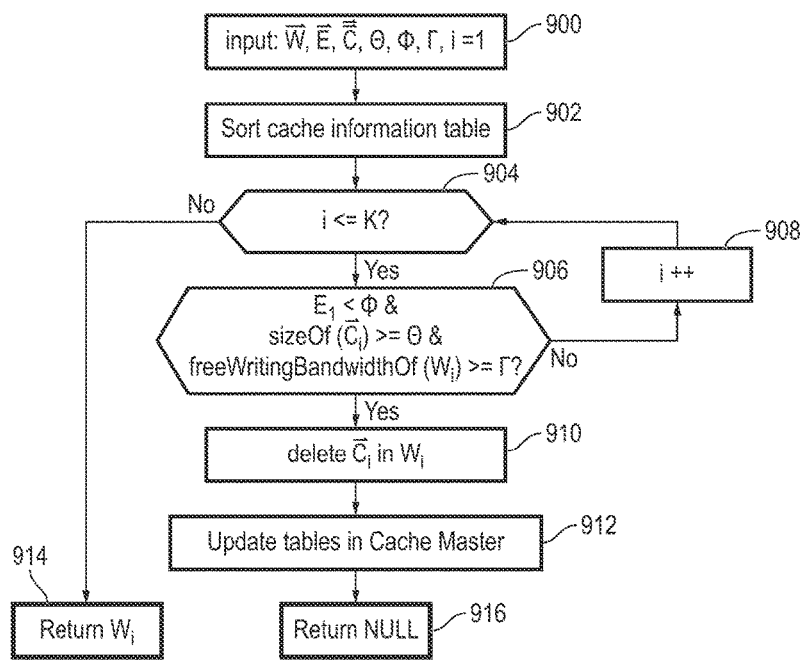
FIG. 9 illustrates aspects of a process for clearing stored cache data, according to some example embodiments of the present invention.

As illustrated in FIG. 9, when there is not enough space to save the new intermediate data, the cache master may check the priority value (score) of each cached data and delete data with a lower priority than the new data, as illustrated in FIG. 8. Referring to FIGS. 8 and 9, $\overrightarrow{\overline{C}}$ : $\{\overline{C}_i | i \in [1, K]\}$, $\vec{W}$ : $\{W_i | i \in [1, K]\}$ and $\vec{E}$ : $\{E_i | i \in [1, K]\}$ represent the cached data list, the worker node ID of the data and their scores recorded in the cache information table of Cache Master. There are K rows in the table. $\overline{C}_i$ is the cache list in row i, $w_i$ is the worker node ID the cache list is in, $E_i$ is the score of $\overline{C}_i$, $\Theta$ be the size of the new intermediate data, $\phi$ is the score of the new intermediate data, and $\Gamma$ is the I/O bandwidth for one writing operation.

When there is no space to save the new intermediate data, Cache Master will execute the algorithm illustrated in FIG. 9 to clear the cache system. The cache information table may be sorted by the score of the cached data, and the data processing cluster searches the cache list to identify cached data that has a larger size and a lower priority score than the new data, and for which the corresponding Cache Worker has enough writing bandwidth to write new data. If the data processing cluster identifies such previously stored intermediate cache data, it will be deleted from the corresponding worker node and the new intermediate cached data may be stored in the corresponding worker node. In addition, both the cache information table and the operation table in Cache Master will be updated. Process 3, below, also illustrates the algorithm of FIG. 9 in pseudo code.

| Process 3: clearCache ( ) | |
|---|---|
| 1 | Procedure clearCache ( ) |
| 2 | Input Data: $\Theta$, $\phi$, $\Gamma$, $\overrightarrow{\overline{C}}$, $\vec{W}$, $\vec{E}$ |
| 3 | sort cache information table by score in ascending order |
| 4 | for i = 1 to K do |
| 5 |    if ( $E_i < \phi$) and ( sizeOf ($\overline{C}_j$) >= $\Theta$ ) and (freeWritingBandwidthOf ($W_i$) > $\Gamma$ ) then |
| 6 |       delete $\overline{C}_j$ in $W_i$ |
| 7 |       update the cache information table and the operation table |
| 8 |       return $\{W_i\}$ |
| 9 | return NULL |

When there is sufficient space in more than one cache worker in the system, cache master may identify a cache worker to finish the writing. The load balance of both the available cache memory space and the I/O bandwidth may be considered. According to some embodiments of the present invention, the coefficient of variation (CV) may be utilized to express the deviation of storage and I/O bandwidth in each worker node. As CV is expressed as a percentage of the overall deviation, the deviation of storage and I/O bandwidth may be compared based on their CV values. The lower the value is, the better the load balance is presented in the cluster. As mentioned in the problem formulation, in the cluster with H worker nodes, S is the storage capacity and B is the maximum IO bandwidth for caching intermediate data in each worker node. And the set S': $\{s_1, s_2, \ldots, s_H\}$ B': $\{b_1, b_2, \ldots, b_H\}$ represent the remaining storage capacities and IO bandwidth of each worker node for caching. The coefficient of variations of the storage space and I/O bandwidth of the cache cluster can be expressed according to the following equations (1) and (2), below $$CV(\text{space}) = \frac{\sqrt{\frac{1}{H}\sum_{i=1}^{H}(s_i - \bar{s})^2}}{\bar{s}} \quad (1)$$

$$CV(io) = \frac{\sqrt{\frac{1}{H}\sum_{i=1}^{H}(b_i - \bar{b})^2}}{\bar{b}} \quad (2)$$

The overall load balance of the cluster considers the load balance of both storage spaces and the disk I/O. An overall coefficient of variation for each node can be expressed according to equation 3, below. Some embodiments of the present invention may set a predetermined value t to adjust the weight of storage balance and disk IO balance, where ε is a number ranging from 0 and 1. According to some embodiments, the space balance may be assigned a greater weight, because the balance of storage space can improve the balance of disk I/O.

$$CV = \varepsilon CV(space) + (1-\varepsilon)CV(io), \varepsilon \in (0,1). \quad (3)$$

In addition, embodiments of the present invention may further consider the locality of the intermediate data. As the intermediate data are saved in the data workers, it may be more efficient to select a cache worker which is close to (e.g., geographically close to) the data worker with the intermediate data (e.g., in a same server rack). Embodiments of the present invention may categorize or group cache workers into three different groups: the local server (the one with the intermediate data), the servers in the same rack, and the servers in different racks. When selecting a node for storing intermediate cache data, embodiments of the present invention may first consider the local server, followed by servers in the same rack, and then servers in different racks.

Referring to FIG. 8, Θ is the size of the intermediate data and Γ is the I/O bandwidth for one writing operation. Cache Master will first choose the candidate servers according to the process illustrated in FIG. 8, and then select a cache server to save the intermediate data, according to the algorithm illustrated in FIG. 10. If there is no candidate server, Cache Master will invoke the process illustrated in FIG. 9 to clear the cache system. Once the intermediate data is successfully stored in the cache system, the tables of cache information and operation will be updated in the Cache Master.

Referring to FIG. 8, at operation 800, in selecting a candidate server, the system may receive input data Θ, Γ, N, S', B', where Θ is the size of the intermediate data, Γ is the IO bandwidth for one writing operation, and N is the list of worker nodes. Q1 is the set of the candidate server which is also the local server (e.g., the server with the intermediate data), Q2 is the set of candidate servers in the same rack, and Q3 is the set of candidate servers in a different rack. Beginning at operation 802, for i=1 to |N| (the length of N, which is the number of worker servers or nodes in the cluster), the system may determine, at operation 806, whether or not $\Theta + S_1$ is less than S or whether $\Gamma + b_1 < B$. If so, the system may increment the counter i at operation 804. If not, the system may determine, at operation 808, whether or not $n_i$ is the local server. If so, the system may add $n_i$ to Q1 at operation 810, and return Q1 at 812. Alternatively, if $n_i$ is not in the local server, the system may determine, at operation 814, whether or not $n_i$ is in the same rack. If so, the system may add $n_i$ to Q2, at operation 816. If $n_i$ is not in the same rack, the system may add $n_i$ to Q3, at operation 818. Returning to operation 802, if i is greater than N, the system may determine whether or not |Q2| is greater than 0. If so, the system may return Q2, at operation 822. If not, the system may return Q3, at operation 824.

Referring to FIG. 9, at operation 900, in clearing cache from the cluster-based cache memory, the system may receive, as input, Θ, φ, Γ, $\overline{C}$, $\overline{W}$, $\overline{E}$ where Θ is the size of the new intermediate data to be stored in the cache system, φ is the score or priority of the new intermediate data, Γ is the bandwidth that would be utilized to write the new intermediate data, and $\overline{C}$, $\overline{W}$, $\overline{E}$ are the values from the cache information table. At operation 902, the system may sort the cache information table according to the priority or score (e.g., in ascending order). Then, at operation 904, starting at i=1, the system may determine whether or not i is less than or equal to K. If not, the system may proceed at operation 908, to increment i. If so, the system may determine, at operation 906, whether or not $E_i < \phi$ and the size of $\overline{C}_i$ is greater than or equal to zero and the free writing bandwidth of $W_i$ is greater than Γ. If so, the system may delete $C_i$ in $W_i$, at operation 910. Then, the system may proceed, at operation 912, to update the tables in the cache master according to the deleted intermediate cache data. Continuing from operation 904, once i is greater than K, the system may return $W_i$.

Figure 10:
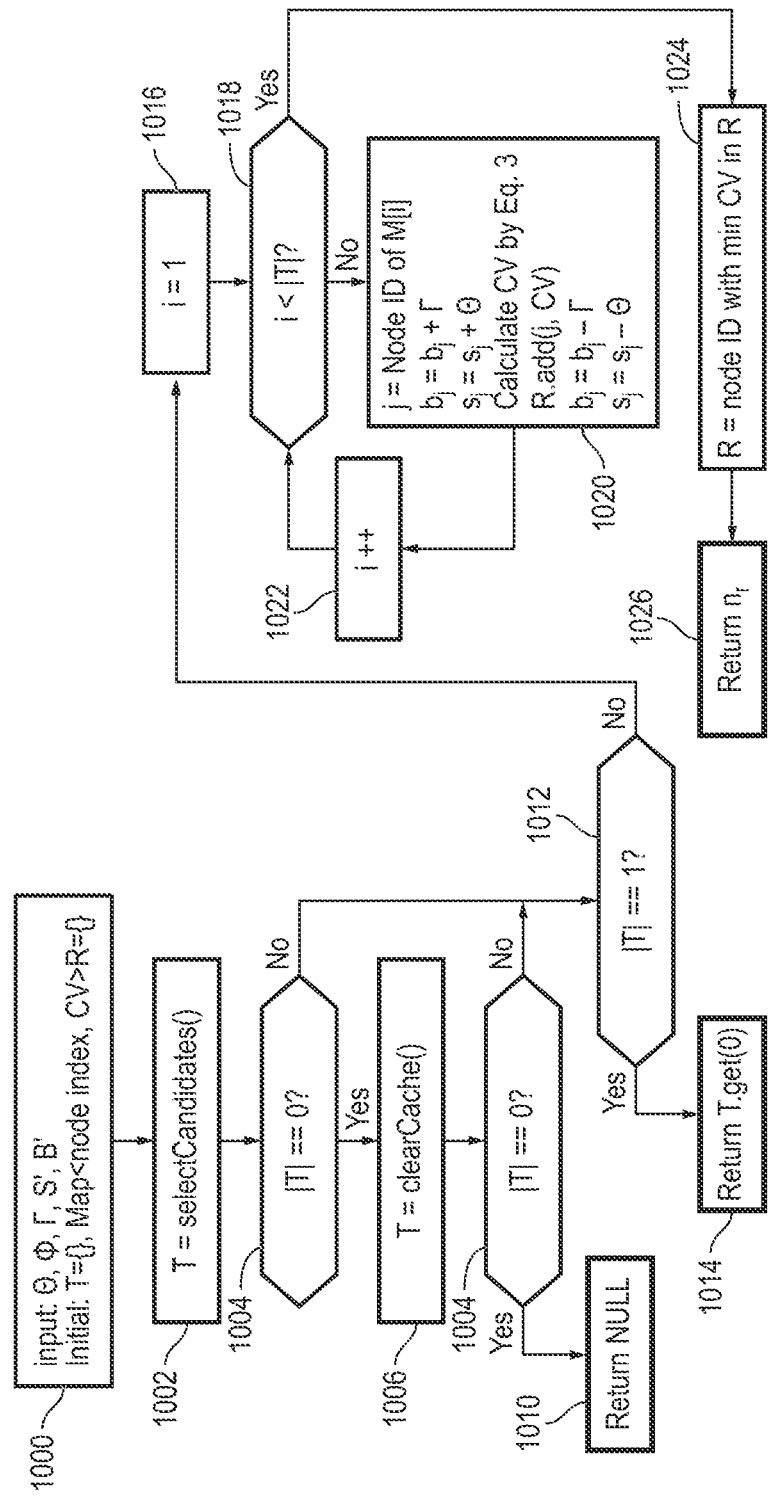
FIG. 10 illustrates aspects of a process for selecting a cache worker, according to some example embodiments of the present invention.

Referring to FIG. 10, at operation 1000, in selecting a cache worker, the system may receive, as input, Θ, Γ, N, S', B'. Additionally, T be initialized as an empty set, where T is a set used to save the list of candidate worker nodes returned from the algorithm for selecting candidates. Additionally, for each worker node, there is a tuple to save the node index and it is matched (e.g., Map <node index, CV>R={ }). At operation 1002, the system may proceed to select a candidate, for example, as discussed above with respect to FIG. 8. Then, at operation, 1004, the system may determine whether or not |T|==0. If |T|==0, the system may proceed at operation 1006 to clear the cache, as discussed above, for example, with respect to FIG. 9. Next, at operation 1008, the system may again determine whether or not |T|==0. If, at operation 1008, |T|==0, the system may return NULL at operation 1010. Alternatively, if, at operations 1004 or 1008, |T|!==0, the system may proceed, at operation 1012, to determine whether or not the length of T is 1 (e.g., |T|==1). If, at operation 1012, T==1, the system may return the first worker node installed in the list T (e.g., T.get(0)). If, however, at operation 1012, |T|!==1, the system may set a counter i to a value of 1, at operation 1016. Then, at operation 1018, the system may determine whether or not i<|T|. If so, the system may proceed to operation 1024 to set R to the node ID with the minimum CV in R. Alternative, if, at operation 1018, i is not <|T|, they system may proceed, at operation 1020, to set j=node ID of M[i], $b_j = b_j + \Gamma$, $s_j = s_j + \Theta$, $$CV = \varepsilon \cdot \frac{\sqrt{\frac{1}{H}\sum_{i=1}^{H}(s_i - \bar{s})^2}}{\bar{s}} + (1-\varepsilon) \cdot \frac{\sqrt{\frac{1}{H}\sum_{i=1}^{H}(b_i - \bar{b})^2}}{\bar{b}},$$

R.add(j, CV), $b_j = b_j - \Gamma$, and $s_j = s_j - \Theta$. Then, at operation 1022, the system may increment i by 1 and then continue looping through operations 1018, 1020, and 1022, until i is not less than |T|.

The processes of FIGS. 8 and 10 are also illustrated in pseudo code in processes 4 and 5 below, respectively.

| | Process 4: selectCandidates ( ) |
|---|---|
| 1 | Procedure selectCandidates ( ) |
| 2 | Input Data: Θ, Γ , N, S', B' |
| 3 | Initial: Q₁ = { }, Q₂ = { }, Q₃ = { } |
| 4 | for i = 1 to |N| do |
| 5 |    if {Θ + s₁ < S) or (Γ + b₁ < B) then |
| 6 |       continue |
| 7 |    else |
| 8 |       if n_i is the local server then |
| 9 |          Q₁.add ( n_i ) |
| 10 |          return Q₁ |
| 11 |       else if n_i is in the same rack then |

-continued

| Process 4: selectCandidates ( ) | |
|---|---|
| 12 | $Q_2$.add ( $n_i$ ) |
| 13 | else |
| 14 | $Q_3$.add ( $n_i$ ) |
| 15 | if $\| Q_2 \| > 0$ then |
| 16 | return $Q_2$ |
| 17 | return $Q_3$ |

| Process 5: selectCacheWorker( ) |   |
|---|---|
| 1 | Procedure selectCacheWorker( ) |
| 2 | Input Data: $\Theta, \Gamma, N, S', B'$ |
| 3 | Initial: T = { }, Map<node index, CV> R = { } |
| 3 | T = selectCandidates ( ) |
| 4 | if \|T\| == 0 then |
| 5 |   T = clearCache( ) |
| 6 | if \|T\| == 0 then |
| 7 |   return NULL |
| 8 | else if \|T\| == 1 then |
| 9 |   return T.get(0) |
| 10 | else |
| 11 |   for i = 1 to \|T\| do |
| 12 |     j = node ID of M[i] |
| 13 |     $b_j = b_j + \Gamma$ |
| 14 |     $s_j = s_j + \Theta$ |
| 15 | $$CV = \varepsilon \frac{\sqrt{\frac{1}{H}\sum_{i=1}^{H}(s_i - \bar{s})^2}}{\bar{s}} + (1-\varepsilon)\frac{\sqrt{\frac{1}{H}\sum_{i=1}^{H}(b_i - \bar{b})^2}}{\bar{b}}$$ |
| 16 |     R.add(j, CV) |
| 17 |     $b_j = b_j - \Gamma$ |
| 18 |     $s_j = s_j - \Theta$ |
| 19 |   r = node ID with min(CV) in R |
| 20 |   return $n_r$ |

Thus, according to one or more example embodiments of the present invention, a data processing cluster may facilitate improved use of resources in the data processing cluster.

Although this invention has been described in certain specific embodiments, those skilled in the art will have no difficulty devising variations to the described embodiment, which in no way depart from the scope and spirit of the present invention. Furthermore, to those skilled in the various arts, the invention itself herein will suggest solutions to other tasks and adaptations for other applications. It is the Applicant's intention to cover by claims all such uses of the invention and those changes and modifications which could be made to the embodiments of the invention herein chosen for the purpose of disclosure without departing from the spirit and scope of the invention. Thus, the present embodiments of the invention should be considered in all respects as illustrative and not restrictive, the scope of the invention to be indicated by the appended claims and their equivalents rather than the foregoing description.

What is claimed is:

1. A system comprising:
   a processor; and
   a memory coupled to the processor, wherein the memory stores instructions that, when executed by the processor, cause the processor to:
   receive, from a data source, a processing profile comprising input data blocks and a plurality of operations for executing using the input data blocks;
   determine whether or not a block of stored intermediate cache data corresponds to an operation from among of the plurality of operations;
   in response to determining the block of stored intermediate cache data corresponds to the operation from among the plurality of operations, generate a simplified processing profile based on the block of stored intermediate cache data, the simplified processing profile comprising a subset of the plurality of operations of the processing profile without the operation corresponding to the block of stored intermediate cache data;
   execute the simplified processing profile by generating a new output data after each operation of the simplified processing profile;
   store the new output data from at least one operation as intermediate cache data; and
   transmit the new output data from a final operation in the simplified processing profile to the data source for display thereby.

2. The system of claim 1, wherein the instructions further cause the processor to, in response to determining the block of stored intermediate cache data corresponds to the operation from among the plurality of operations, identify a location of the stored intermediate cache data among a plurality of worker nodes.

3. The system of claim 1, wherein generating the simplified processing profile comprises removing the operation corresponding to the block of stored intermediate cache data.

4. The system of claim 1, wherein the instructions further cause the processor to:
   identify a candidate worker node from among a plurality of worker nodes for storing the new output data according to a load balance calculation of at least one of storage space of each of the worker nodes and input/output bandwidth of each of the worker nodes; and
   store the new output data at the identified candidate worker node.

5. The system of claim 1, wherein the instructions further cause the processor to:
   identify whether or not there is sufficient space among a plurality of worker nodes to store the new output data; and
   in response to determining there is not sufficient space among the plurality of worker nodes, clear a block of pre-stored intermediate cache data having a lower priority level than the new output data.

6. A method comprising:
   receiving, by a processor, from a data source, a processing profile comprising input data blocks and a plurality of operations for executing using the input data blocks;
   determining, by the processor, whether or not a block of stored intermediate cache data corresponds to an operation from among of the plurality of operations;
   in response to determining the block of stored intermediate cache data corresponds to the operation from among the plurality of operations, removing, by the processor, the operation from the processing profile to generate a simplified processing profile, the simplified processing profile comprising a subset of the plurality of operations of the processing profile without the operation corresponding to the block of stored intermediate cache data;
   executing, by the processor, the simplified processing profile by generating a new output data after each operation of the simplified processing profile;
   storing, by the processor, the new output data from at least one operation as intermediate cache data; and transmitting, by the processor, the new output data from a final operation in the simplified processing profile to the data source for display thereby.

7. The method of claim 6, further comprising, in response to determining the block of stored intermediate cache data corresponds to the operation from among the plurality of operations, identifying, by the processor, a location of the stored intermediate cache data among a plurality of worker nodes.

8. The method of claim 6, wherein generating the simplified processing profile comprises removing, by the processor, the operation corresponding to the block of stored intermediate cache data.

9. The method of claim 6, further comprising identifying, by the processor, a candidate worker node from among a plurality of worker nodes for storing the new output data according to a load balance calculation of at least one of storage space of each of the worker nodes and input/output bandwidth of each of the worker nodes.

10. The method of claim 9, further comprising storing, by the processor, the new output data at the identified candidate worker node.

11. The method of claim 6, further comprising:
identifying, by the processor, whether or not there is sufficient space among a plurality of worker nodes to store the new output data; and
in response to determining there is not sufficient space among the plurality of worker nodes, clearing, by the processor, a block of pre-stored intermediate cache data having a lower priority level than the new output data.

12. A method comprising:
receiving, by a processor, from a data source, a processing profile comprising input data blocks and a plurality of operations for executing using the input data blocks;
determining, by the processor, whether or not a block of stored intermediate cache data corresponds to an operation from among of the plurality of operations; and
in response to determining the block of stored intermediate cache data corresponds to the operation from among the plurality of operations, removing, by the processor, the operation from the processing profile to generate a simplified processing profile, the simplified processing profile comprising a subset of the plurality of operations of the processing profile without the operation corresponding to the block of stored intermediate cache data;
executing, by the processor, one or more of the operations of the processing profile to generate a new output data after each of the executed one or more operations;
storing, by the processor, the new output data from at least one of the one or more operations as intermediate cache data; and
transmitting, by the processor, the new output data from a final operation from among the one or more operations to the data source for display thereby.

13. The method of claim 12, further comprising, in response to determining the block of stored intermediate cache data corresponds to the operation from among the plurality of operations, identifying, by the processor, a location of the stored intermediate cache data among a plurality of worker nodes.

14. The method of claim 12, wherein the method further comprises executing, by the processor, each of the plurality of operations from the subset.

15. The method of claim 12, further comprising identifying, by the processor, a candidate worker node from among a plurality of worker nodes for storing the new output data according to a load balance calculation of at least one of storage space of each of the worker nodes and input/output bandwidth of each of the worker nodes.

16. The method of claim 15, further comprising storing, by the processor, the new output data at the identified candidate worker node.

17. The method of claim 12, further comprising:
identifying, by the processor, whether or not there is sufficient space among a plurality of worker nodes to store the new output data; and
in response to determining there is not sufficient space among the plurality of worker nodes, clearing, by the processor, a block of pre-stored intermediate cache data having a lower priority level than the new output data.

\* \* \* \* \*